D. MILLER.
FLUID CLUTCH.
APPLICATION FILED APR. 15, 1912.

1,173,599.

Patented Feb. 29, 1916.
3 SHEETS—SHEET 1.

D. MILLER.
FLUID CLUTCH.
APPLICATION FILED APR. 15, 1912.

1,173,599.

Patented Feb. 29, 1916.
3 SHEETS—SHEET 2.

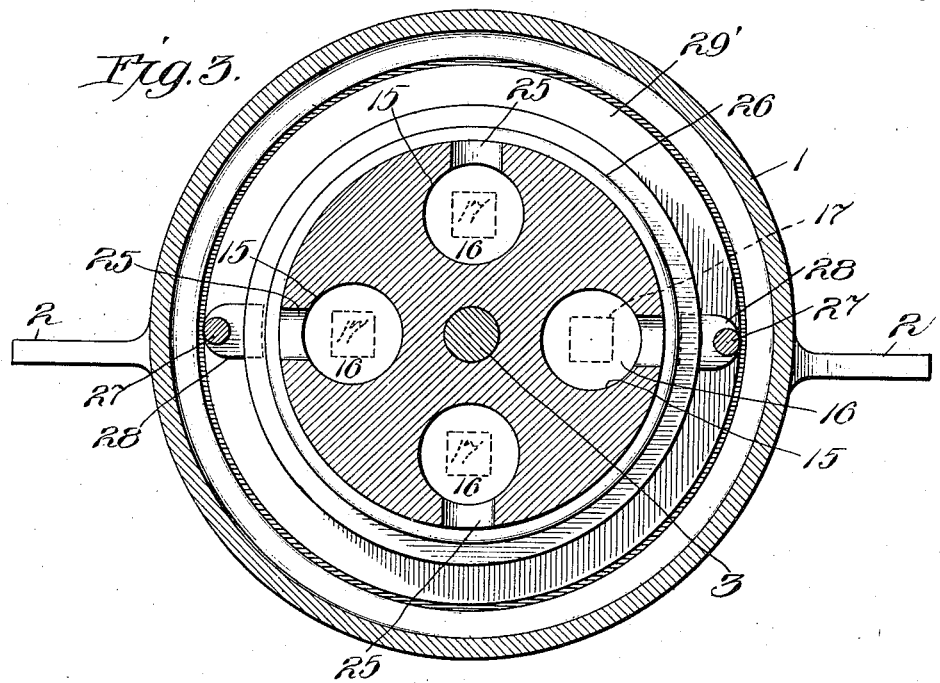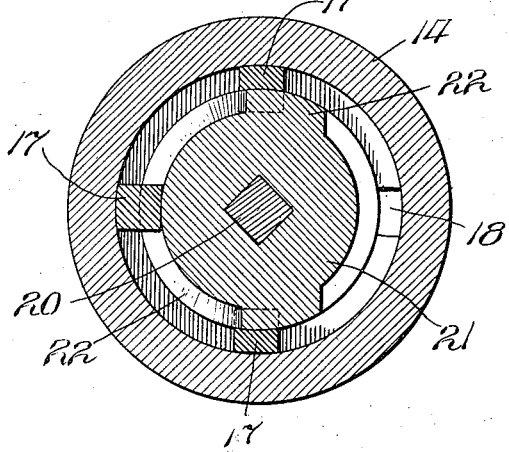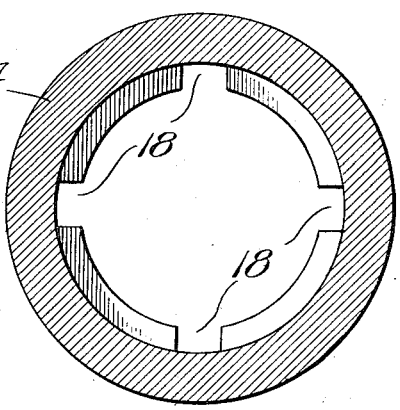

UNITED STATES PATENT OFFICE.

DORR MILLER, OF CHICAGO, ILLINOIS, ASSIGNOR TO MILLER TRANSMISSION COMPANY, A CORPORATION OF MAINE.

FLUID-CLUTCH.

1,173,599.  Specification of Letters Patent.  Patented Feb. 29, 1916.

Application filed April 15, 1912. Serial No. 690,782.

*To all whom it may concern:*

Be it known that I, DORR MILLER, a citizen of the United States, residing at Chicago, county of Cook, State of Illinois, have invented a certain new and useful Improvement in Fluid-Clutches, and declare the following to be a full, clear, and exact description of the same, such as will enable others skilled in the art to which it pertains to make and use the same, reference being had to the accompanying drawings, which form a part of this specification.

My invention has for its object to produce a simple and efficient mechanism adapted to be placed between a driving shaft and a driven shaft so as to leave the shafts uncoupled from each other or couple them together to run at a wide range of relative speeds.

A further object of my invention is to produce a simple and novel hydraulic transmission mechanism for enabling a driving member to rotate a driven shaft at various speeds in either direction.

Figure 1:
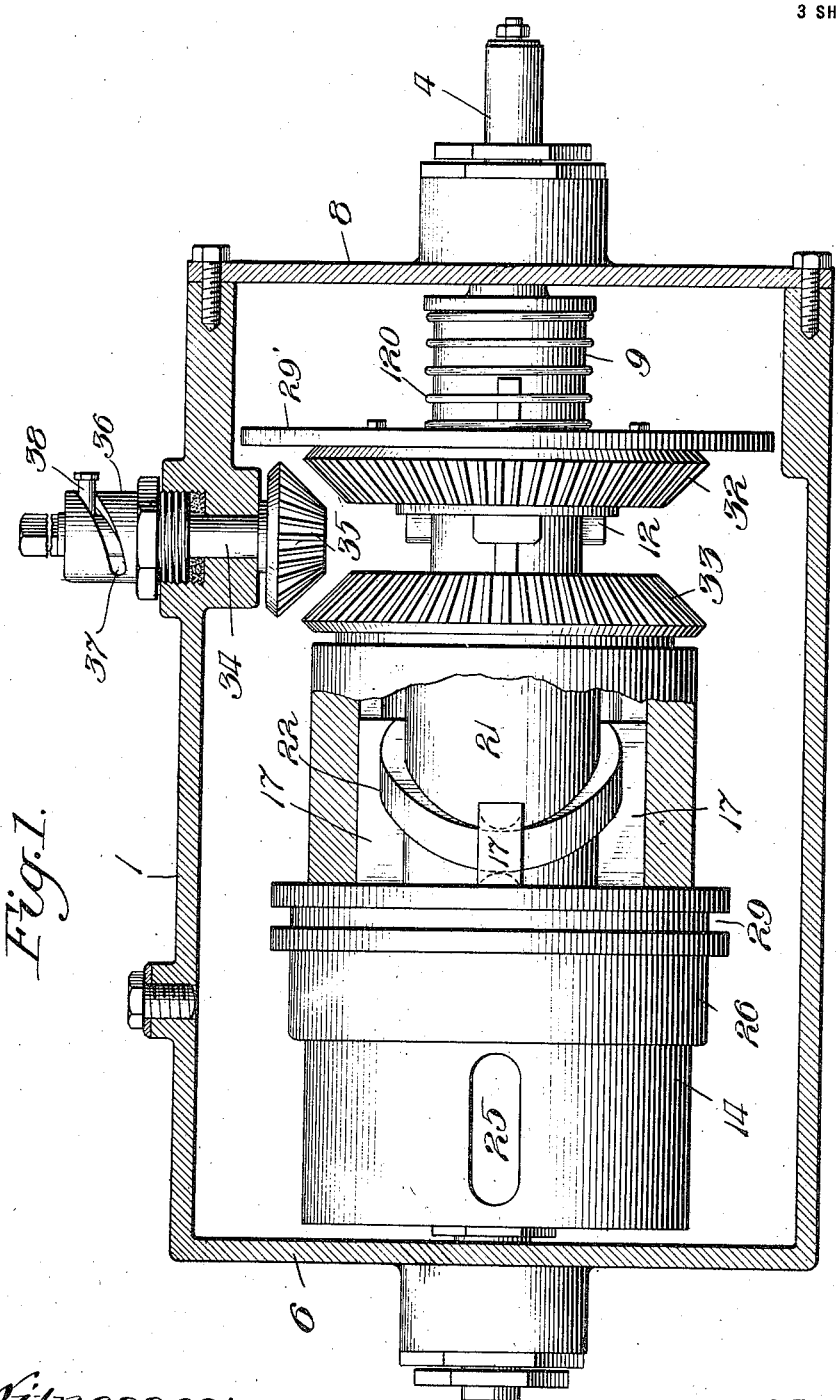
Figure 2:
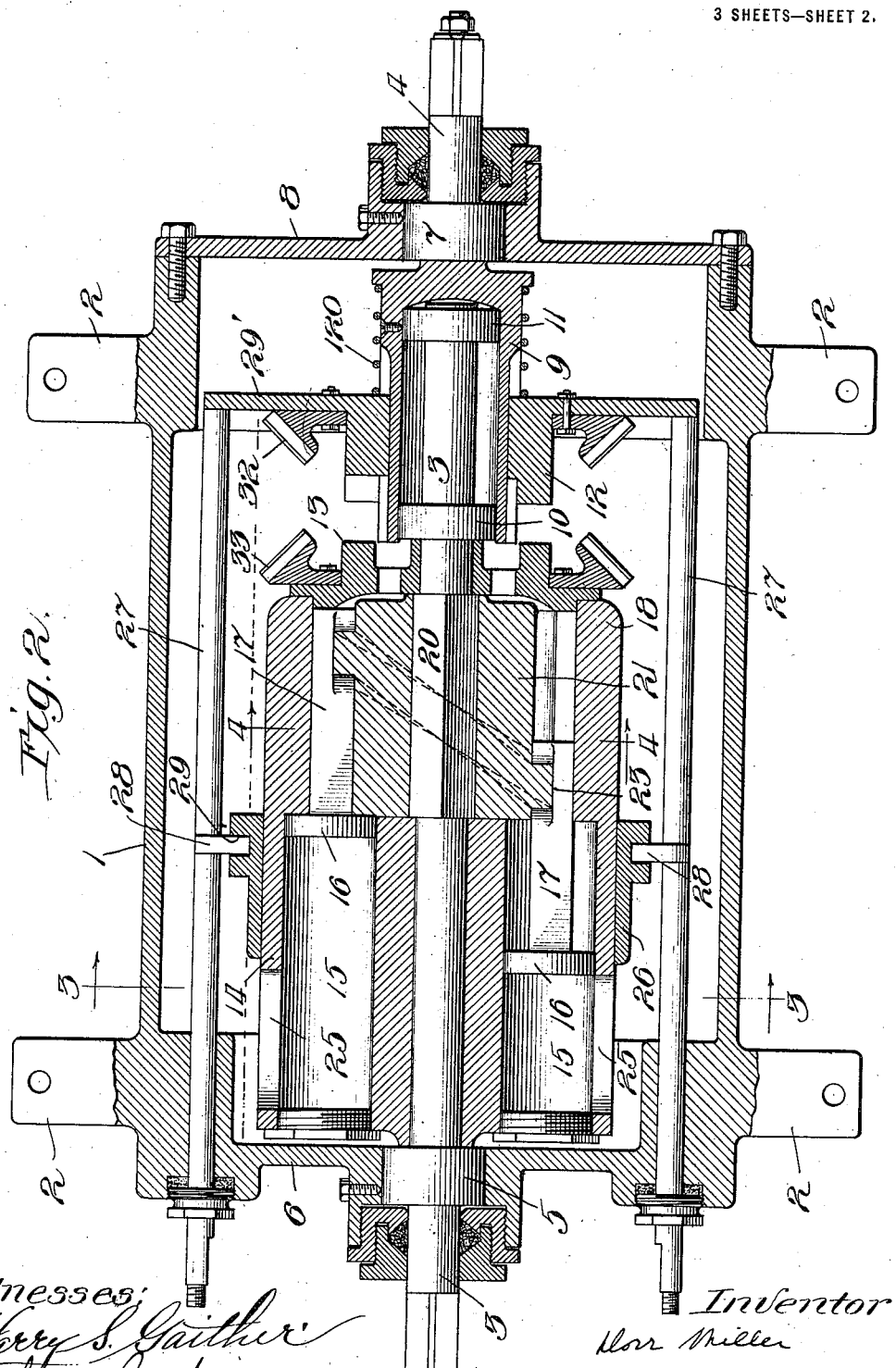

The various features of novelty whereby my invention is characterized will hereinafter be pointed out with particularity in the claims; but, for a full understanding of my invention, and of its objects and advantages, reference may be had to the following detailed description taken in connection with the accompanying drawings, wherein:

Figure 1 is a view partly in section and partly in elevation of a mechanism arranged in accordance with a preferred form of my invention; Fig. 2 is a central longitudinal section taken at right angles to the plane of Fig. 1; Fig. 3 is a section on line 3—3 of Fig. 2; Fig. 4 is a section on line 4—4 of Fig. 2; and Fig. 5 is a view similar to Fig. 4 with the central cam member removed.

Reference being had to the drawings, 1 represents a casing of any suitable construction, preferably cylindrical in form. In the arrangement shown, the casing is provided with a plurality of projecting ears 2 by which it may be secured to a suitable support, as for example to the frame of an automobile. Projecting axially into the casing through one end thereof is a driving shaft 3. Into the other end of the casing extends a driven shaft 4 co-axial with the driving shaft. The driving shaft has a suitable packed bearing 5 in the head or end 6 through which it projects. The driven shaft has a similar bearing 7 in the other head or end 8. The head or end 8 is illustrated as being detachable so as to permit the parts housed within the casing to be removed therefrom; but it will of course be understood that any other portion of the casing may be made removable for this purpose. The driven shaft has on its inner end an enlarged part 9 in the form of an elongated cup and in this part are suitable bearings 10 and 11 which revolubly support the inner end of the driving shaft. On the member 9 is splined a clutch member 12 which is movable axially thereon but held against rotation relative thereto. A spring 120 back of the member 12 exerts its tension in the direction to force the clutch member inwardly toward the opposite end of the casing. Rotatable upon the driving shaft, between the head 6 and the member 9 is a clutch member 13 adapted to coöperate with the member 12 to lock the two shafts together. In the arrangement shown, the member 13 is detachably secured upon the end of a cylindrical part 14 journaled upon the driving shaft. In one end of the member 14 are a plurality of cylindrical bores 15 arranged about and extending parallel with the axis of the driving shaft. In each of the cylindrical bores is a piston 16 having a stem 17 which slides in and is guided by a groove 18 within a rim-like annular portion 19 at one end of the member 14. The portion of the driving shaft lying within the annular member 19 is squared as indicated at 20 and on this squared portion is a block 21 having a continuous rib-like projection 22 extending diagonally around the same. Each of the piston stems is provided in its inner face adjacent to its free end with a transverse notch or pocket 23 shaped to receive and fit upon the continuous rib or cam 22. It will be seen that the block 21 revolves with the driving shaft and, if the member 14 is held stationary, the pistons are reciprocated once during each revolution of the driving shaft. The pitch of the cam is such that each piston is reciprocated from one end of its cylinder toward the other. The member 14 is provided with a series of elongated ports 25 extending from the exterior thereof into the cylindrical bores 15, there being in the arrangement shown one port for each of the bores. Upon the member 14, and having a sliding fit thereon, is a ring-like valve 26 wide enough to close the ports completely in one position of the valve. The valve may conveniently be controlled and actuated by means of two rods 27 which extend through the head 6 of the casing and lie parallel with the axis thereof; each rod having a finger or projection 28 which lies in an annular groove 29 in the periphery of the valve. It will be seen that this arrangement permits the valve to rotate freely independently of the actuating members and at the same time causes the valve to be actuated positively to close or open the ports when the actuating members are drawn in and out. I also make use of the rods 27 to control the clutch, the member 12 being provided for this purpose with a projecting annular flange 29' against which the inner ends of the rods are adapted to press when the rods are in the position in which they hold the valve open, thus holding the clutch member 12 away from its coöperating clutch member against the tension of the spring.

I place in the casing sufficient oil to immerse the member 14 completely when the valve is opened and the cylindrical bores are filled back of the pistons. Consequently when the driving shaft is operated the pistons move back and forth, forcing the oil out through the ports and drawing it in again, as long as the valve is open, there being very little resistance to the movement of the piston and the inertia of the member 14 being sufficient to permit it to remain stationary. When the valve rods are drawn out, the valve begins to close the ports, and the clutch member 12 comes into engagement with its coöperating clutch member. The ports preferably have approximately the same cross-sectional area as the pistons so that as soon as the valve begins to overlap the ports there is a back pressure upon the pistons as they travel in the direction to expel the oil, and therefore the member 14 begins to move slowly with the cam block. As the closing of the ports progresses, the resistance to the reciprocation of the pistons increases until finally, when the ports are entirely closed the pistons are locked against reciprocation and the member 14 rotates at the same speed as the driving shaft. It will thus be seen that the member 14 may be gradually brought up to the speed of the driving shaft and, by arresting the valve at the proper point, the member 14 may be caused to be driven at any desired speed relative to the speed of the driving shaft. Since the member 14 is clutched to the driven shaft, the speed of the driven shaft is the same as that of the member 14. Consequently the driven shaft may be allowed to remain stationary and may be brought gradually and smoothly to any desired speed up to the speed of the driving shaft.

My improved device or apparatus serves therefore as a clutch which may be applied gradually and smoothly and as a variable speed transmission device which permits the driven shaft to be rotated at any desired speed relative to that of the driving shaft.

In many cases, particularly where used as a transmission mechanism for automobiles, it is necessary to have both forward and reverse speeds. For a reverse rotation of the driven shaft I have provided on the two clutch members beveled gears 32 and 33, each being rigidly connected with the clutch member with which it is associated. In the side of the casing I have journaled a short stub shaft 34 on the inner end of which is a beveled pinion 35 adapted to mesh with the gear wheels 32 and 33. The stub shaft is mounted so that it may be moved axially so as to bring the pinion into engagement with the gear wheels or withdraw it as desired. In the arrangement shown there is supported on the casing around the outer end of the stub shaft a sleeve 36 having a diagonal cam slot 37 through which projects a pin 38 carried by the stub shaft. When the stub shaft is turned in any suitable manner, by a wrench or otherwise, the pin 38, traveling in the slot 37, causes the stub shaft to move in or out depending upon the direction of rotation. The parts are so arranged that when they are in the positions indicated in Figs. 1 and 2, the clutch being out of action, sufficient room is provided between the two gear wheels for the reception of the pinion. Therefore by turning the stub shaft, the pinion is brought into operative relation to the gear wheels so that when the valve rods are actuated to close the ports partially or wholly, the driven shaft is driven from the member 14 through the train of gearing instead of directly through the clutch and a rotation in the opposite direction from that produced by the clutch is obtained.

It will now be seen that I have provided means whereby a driving shaft, such as the shaft of an automobile engine, may be gradually clutched to a driven shaft so as to start the driven shaft smoothly and without jar, and which will permit the driven shaft to be operated in either direction at any desired speed between zero and the speed of the driving shaft.

While I have illustrated and described in detail only a single preferred form of my invention, I do not desire to be limited to the particular structural details thus illustrated and described; but intend to cover all forms and arrangements which come within the terms employed in the definitions of my invention constituting the appended claims.

I claim:

1. In combination, a casing, a driving shaft projecting through and journaled in one end of the casing, a driven shaft projecting through and journaled in the other end of the casing, the inner end of said driven shaft being hollow, bearings in said driven shaft for supporting the inner end of the driving shaft, a hydraulic transmission device carried by said driving shaft, and a clutch between said transmission device and the driven shaft.

2. In combination, a casing, a driving shaft projecting through and journaled in one end of the casing, a driven shaft projecting through and journaled in the other end of the casing, the inner end of said driven shaft being in the form of a cup, bearings in said cup for supporting the inner end of the driving shaft, a hydraulic transmission device carried by said driving shaft, and a clutch between said transmission device and the driven shaft.

3. In combination, a driving shaft, a driven shaft, and a hydraulic transmission mechanism between said shafts; said transmission mechanism comprising a cylindrical member revoluble on the driving shaft and having a plurality of chambers distributed about the axis thereof, there being a port leading from each of said chambers to the exterior of said member, a liquid container surrounding said member, a rim-like valve fitting about said member and movable lengthwise thereof to control said ports, pistons in said chambers, and means on the driving shaft for reciprocating said pistons.

4. In combination, a driving shaft, a driven shaft, and a hydraulic transmission mechanism between said shafts; said transmission mechanism comprising a cylindrical member revoluble on the driving shaft and having a plurality of chambers distributed about the axis thereof, there being a port leading from each of said chambers to the exterior of said member, a liquid container surrounding said member, a rim-like valve fitting about said member and movable lengthwise thereof to control said ports, pistons in said chambers, and means on the driving shaft for reciprocating said pistons, the parts being so arranged that the pistons are displaced relative to each other with reference to their strokes.

5. In combination, a driving shaft, a driven shaft, and hydraulic transmission mechanism between said shafts; said transmission mechanism including a hydraulic device mounted on the driving shaft, a clutch between the driven shaft and said device, a controller for said device, and means associated with the controller for actuating the clutch.

6. In combination, a driving shaft, a driven shaft, a chambered member revoluble upon the driving shaft, a piston in the chamber of said member, said member having a port leading from said chamber to the exterior thereof, means for controlling the effective area of said port, an oil container surrounding said member, a cam block rotatable with the driving shaft, said cam block having a continuous rib extending diagonally around the same, a stem on said piston, said stem having a notch fitting over said rib, and means for connecting said member to the driven shaft.

7. In combination, a driving shaft, a driven shaft, a member revoluble relative to the driving shaft, hydraulic clutch mechanism between said member and the driving shaft for causing said member to rotate at a variable speed for a given speed of the driving shaft, and a clutch between said member and the driven shaft.

8. In combination, a driving shaft, a driven shaft, and a hydraulic transmission mechanism between said shafts; said transmission mechanism comprising a cylindrical member revoluble on the driving shaft and having a series of outwardly opening ports, a liquid container surrounding said member, a ring-like valve fitting about said member and movable lengthwise thereof to control said ports, and means within said member and actuated by the driving shaft for pumping liquid through said ports.

In testimony whereof, I, sign this specification in the presence of two witnesses.

DORR MILLER.

Witnesses:
 WM. F. FREUDENREICH,
 HARRY S. GAITHER.